(12) United States Patent
Welch et al.

(10) Patent No.: US 10,442,176 B2
(45) Date of Patent: Oct. 15, 2019

(54) ADDITIVE LAYER MANUFACTURING

(71) Applicant: ROLLS-ROYCE plc, London (GB)

(72) Inventors: Stewart T Welch, Birmingham (GB);
Robert Bowerman, Birmingham (GB)

(73) Assignee: ROLLS-ROYCE plc, London (GB)

( * ) Notice: Subject to any disclaimer, the term of this patent is extended or adjusted under 35 U.S.C. 154(b) by 180 days.

(21) Appl. No.: 15/402,717

(22) Filed: Jan. 10, 2017

(65) Prior Publication Data

US 2017/0225403 A1    Aug. 10, 2017

(30) Foreign Application Priority Data

Feb. 5, 2016  (GB) .................................. 1602067.9

(51) Int. Cl.
| | | |
|---|---|---|
| *B29C 47/00* | (2006.01) | |
| *B33Y 40/00* | (2015.01) | |
| *B29C 64/20* | (2017.01) | |
| *B33Y 30/00* | (2015.01) | |
| *B29C 64/40* | (2017.01) | |

(Continued)

(52) U.S. Cl.
CPC .............. *B33Y 40/00* (2014.12); *B29C 64/20* (2017.08); *B29C 64/40* (2017.08); *B33Y 30/00* (2014.12); *B22F 2003/1056* (2013.01); *B29C 64/124* (2017.08); *B29C 64/153* (2017.08); *B29C 64/214* (2017.08); *B29C 64/307* (2017.08); *B29C 64/321* (2017.08); *Y02P 10/295* (2015.11)

(58) Field of Classification Search
CPC ... B29C 64/214; B29C 64/307; B29C 64/321; B29C 64/124; B29C 64/153; B33Y 10/00; B33Y 30/00; B33Y 40/00; Y02P 10/295; B22F 2003/1056

USPC ........................................... 425/375; 264/308
See application file for complete search history.

(56) References Cited

U.S. PATENT DOCUMENTS 5,174,931 A      12/1992  Almquist et al.
10,207,453 B2 *   2/2019  Ferguson ............... B33Y 30/00
(Continued)

FOREIGN PATENT DOCUMENTS

| CN | 203635914 U | 6/2014 |
|---|---|---|
| DE | 10236907 A1 | 2/2004 |

(Continued)

OTHER PUBLICATIONS

WO 2008/064620 A1, Herzog, Frank, published Jun. 5, 2008, machine translation GER to ENG. (Year: 2008).*

(Continued)

*Primary Examiner* — Joseph S Del Sole
*Assistant Examiner* — Lawrence D. Hohenbrink, Jr.
(74) *Attorney, Agent, or Firm* — Oliff PLC

(57) ABSTRACT

A doctor device configured for use in recoating in an operating additive layer manufacturing apparatus. The doctor device includes at least one blade having a first surface and a second surface. The at least one blade is configured to move in a first direction and a second direction, which is opposite to the first direction. The first surface is configured to bend in the second direction upon the at least one blade moving in the first direction and contacting a surface of an additive layer, and the second surface is configured to be rigid upon the at least one blade moving in the second direction and contacting the surface of an additive layer, such that the at least one blade does not bend.

12 Claims, 4 Drawing Sheets

(51) Int. Cl.
  *B29C 64/153* (2017.01)
  *B29C 64/124* (2017.01)
  *B29C 64/214* (2017.01)
  *B29C 64/307* (2017.01)
  *B29C 64/321* (2017.01)
  *B22F 3/105* (2006.01)

(56) References Cited

U.S. PATENT DOCUMENTS

| | | | |
|---|---|---|---|
| 2002/0152002 A1 | 10/2002 | Lindemann et al. | |
| 2004/0170765 A1* | 9/2004 | Ederer | B05C 11/023 |
| | | | 427/355 |
| 2013/0256953 A1 | 10/2013 | Teulet | |
| 2015/0367415 A1* | 12/2015 | Buller | B23K 26/346 |
| | | | 419/53 |
| 2016/0279869 A1 | 9/2016 | Gruber et al. | |

FOREIGN PATENT DOCUMENTS

| | | | | |
|---|---|---|---|---|
| DE | 102006056422 B3 | | 4/2008 | |
| WO | WO-2008064620 A1 | * | 6/2008 | B22F 3/1055 |
| WO | 2015/075094 A1 | | 5/2015 | |

OTHER PUBLICATIONS

Jun. 22, 2017 Search Report issued in European Patent Application No. 17150873.2.
May 4, 2016 Search Report issued in British Patent Application No. 1602067.9.

\* cited by examiner

ADDITIVE LAYER MANUFACTURING

FIELD OF THE INVENTION

The present invention is related to additive layer manufacturing (ALM) methods, more particularly to such methods wherein selected regions within a fluid mass of material are processed across a number of sequential layers to cause local solidification of the material and built up a three dimensional solid object within the fluid mass.

BACKGROUND TO THE INVENTION

Additive layer manufacturing methods can be broadly divided into two groups. In a first group, material is deposited sequentially in patterned layers, the pattern of each layer representing a two dimensional cross section of a three dimensional shape of an object. As each layer is deposited atop a previous layer, a three dimensional object is built. Examples of this group of methods include; direct energy deposition (where focussed thermal energy is used to fuse materials as they are being deposited), material extrusion (where an extrusion head moves in a pattern selectively dispensing material through an orifice as it travels) and sheet lamination (where sheets of material already defining a two-dimensional pattern are bonded in sequence to build up the three dimensional object.)

In the second group, the process starts with a bulk mass which may, for example, be a bed of powdered material such as a ceramic, a ferrous alloy or a non-ferrous alloy, or a vat of liquid typically comprising a photopolymer. Regions within the mass are selectively treated, for example by melting, sintering, photochemical reaction or interaction with a chemical bonding agent, to solidify. However unlike with the first group, the untreated material remains in a layer as the next layer is formed. Surplus (untreated) material may be removed when the three dimensional build is complete, through it also known for surplus material to sometimes be contained within cavities of the three-dimensional object.

Within the second group of ALM methods, a layer of untreated material may be deposited onto an already treated layer by dispersal from a hopper or by dipping the treated layer below the surface of the untreated material. For the three-dimensional shape to be properly controlled, the thickness and consistency of thickness of each layer to be treated must be carefully controlled. This is conventionally achieved by positioning a top surface a fixed distance from the tip of a "doctor" across a top surface of the material to level out the top surface.

Various forms of doctor are known. In its simplest form the doctor is a straight-edged, rigid blade which is skimmed across the material surface gradually pushing away any excess from the newly added material layer. In a more advanced form, the straight edged, rigid blade may comprise a hollow through which a vacuum can be applied. The blade is positioned a small distance from the required top surface level. Rather than push material away, such a device sucks excess material into the hollow as it passes across the surface. This can result in dips in the surface. The vacuum blade is subsequently lowered to the required surface level and passes over the surface again. In regions where there is insufficient material remaining at the top surface, material is drawn from the hollow back onto the surface. Where the material to be treated is viscous, there may be a waiting time between recoating and treating while the viscous top surface drains and settles. In some cases highly viscous materials may not drain and settle resulting in the top surface rising above the desired height and a consequent, detrimental effect on the quality of the component.

One challenge with known doctor devices is stresses seen in an already treated layer when the doctor device passes over a successive layer. High stresses can result in damage to the component. Factors known to influence such stresses include: blade speed, material type, the gap between the blade and the treated surface, and the structure of material around and within the blade.

SUMMARY OF THE INVENTION

In accordance with the present invention there is provided a doctor device configured for use in recoating in an operating additive layer manufacturing apparatus, the device configured, in use, to flex during at least a first sweep across a surface.

In some embodiments, the device is configured, in use, to flex on a first sweep across a surface (8a) and remain stiff relative to the flexibility exhibited in the first sweep during a second sweep of the surface.

The first and second sweep may be taken in the same direction or opposite directions. For example, the doctor device comprises multiple blades including a first which is flexible relative to a second. The device may comprise one or more blades between the first and second blade arranged in sequence in decreasing order of flexibility. In the latter case, it will be appreciated multiple sweeps can be undertaken simultaneously as the doctor device is drawn across the surface in one direction, thus the second sweep may be taken simultaneously with the first sweep. In an alternative arrangement, the device may comprise a surface which flexes when drawn across the surface in a first direction and a surface which is relatively stiff when drawn across the surface in a second direction. This may be achievable with a single blade engineered to have directional flexion. Alternatively such a device comprises a first flexible blade adjacent and in parallel alignment with a second relatively stiff blade. Flexion of the first blade may be restricted by its abutting against the second blade when drawn in one direction (the second direction) across the surface and free when drawn in an opposite direction (the first direction).

Flexing in the first direction may be achieved in a variety of ways. In one example, the doctor device comprises a blade of flexible material. In another option a blade of non-flexible material is arranged to pivot under load in the first direction, the pivot providing the flex. Such a blade may abut against a stop when drown in the second direction preventing any flex. A resilient member may connect a blade of non-flexible material to a body, the resilient member arranged to provide for flexure in the first direction and no flexure in the second. Other means for providing flexure in a first direction and no flexure in a second direction will no doubt occur to the skilled addressee without departing from the scope of the invention as claimed.

Where a blade comprises a flexible material, suitable materials for the flexible blade may include aluminium, stainless steel, plastics, rubber provided in a suitable thin cross section.

It will be appreciated that the doctor device of the invention could be further adapted to include a cavity through which, in use, a vacuum may be applied.

The edge of the blade which contacts the surface may have a sharp edge. Alternatively, the edge may be blunt or rounded.

BRIEF DESCRIPTION OF THE FIGURES

An embodiment of the invention will now be further described by way of example with reference to the accompanying figures in which.

DETAILED DESCRIPTION OF THE FIGURES AND SOME EMBODIMENTS

Figure 1:
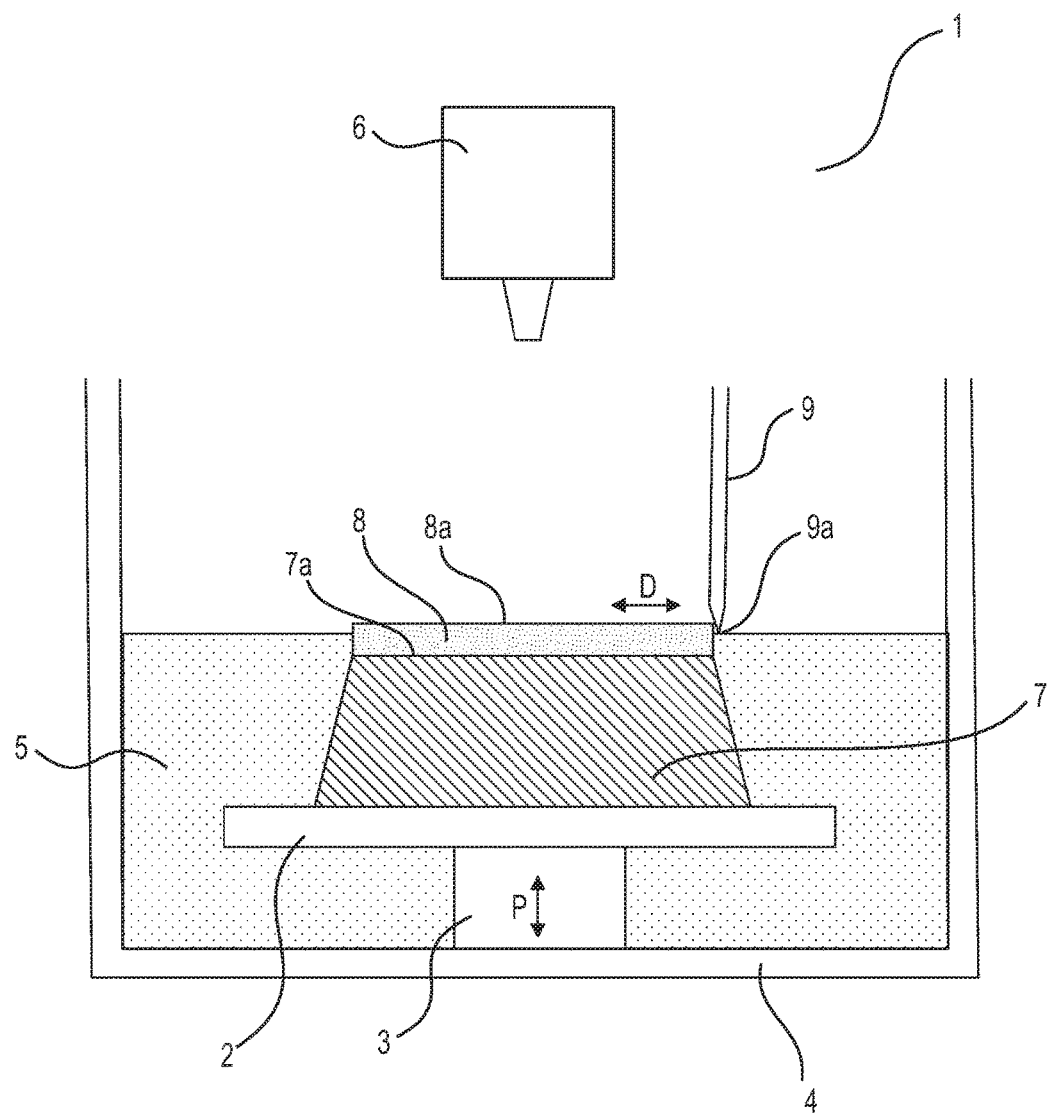
FIG. 1 is a schematic showing the essential components of an ALM apparatus used to perform an ALM method of the second group identified above.

As can be seen in FIG. 1, a known ALM apparatus 1 comprises a baseplate 2 on a moveable platform 3 which is able to raise and lower the baseplate 2 (in opposing directions as represented by arrow P) within a reservoir 4. The reservoir 4 contains a mass of fluid 5 which may, for example (but without limitation), be a liquid photopolymer or a metal or ceramic powder which under treatment from a focussed energy beam from an energy beam source 6 forms a solid body 7. The solid body 7 is built up in layers from the baseplate 2 by focussing the energy beam at a top layer 8 of the fluid 5. A new top layer 8 is deposited onto the solid body 7 after a previous layer has been treated by the energy beam and solidified to form part of the body 7. For example, the layer may be deposited from a hopper, or the solid body 7 may be dipped under a surface of the fluid 5. The position of the top layer with respect to the energy beam source 6 can be controlled by adjusting the platform 3.

For optimum results, it is necessary to ensure that the top layer 8, prior to treatment by an energy beam from source 6, is of a desired and a consistent thickness across its surface. Levelling and thickness control is achieved using a doctor 9. The doctor 9 of FIG. 1 is typical of the prior art and comprises a rigid blade with a bevelled edge.

The doctor 9 is mounted to a carriage (not shown) which allows it to be moved in two opposing directions as represented by arrow D. It can be seen, before a first pass, the tip 9a of the doctor blade 9 sits relatively below a top surface 8a of the top layer 8. As the blade is swept across the top layer 8, material above the level of tip 9a is pushed across and away from an upper surface 7a of the solid body 7. Since the doctor blade 9 is inflexible and the material of top layer 8 still fluid, a constant distance is maintained between the blade tip 9a and the upper surface 7a of the solid body 7. This results in a defined and consistent thickness of the top layer 8 after the sweep. Once the desired thickness has been achieved in the top layer 8, the layer can be treated by an energy beam from the source 6 adding to the existing solid body 7.

A conventional doctor blade 9 is rigid and set to move at a constant rate. As the doctor blade 9 contacts material in a top layer 8 above the upper surface 7a of solid body 7 an instantaneous force is exerted on the blade 9. This force is transferred to the material in top layer 8 and the body 7. If the force is high, for example due to high viscosity of the material, or the body is fragile damage to the body 7 can result.

Figure 2:
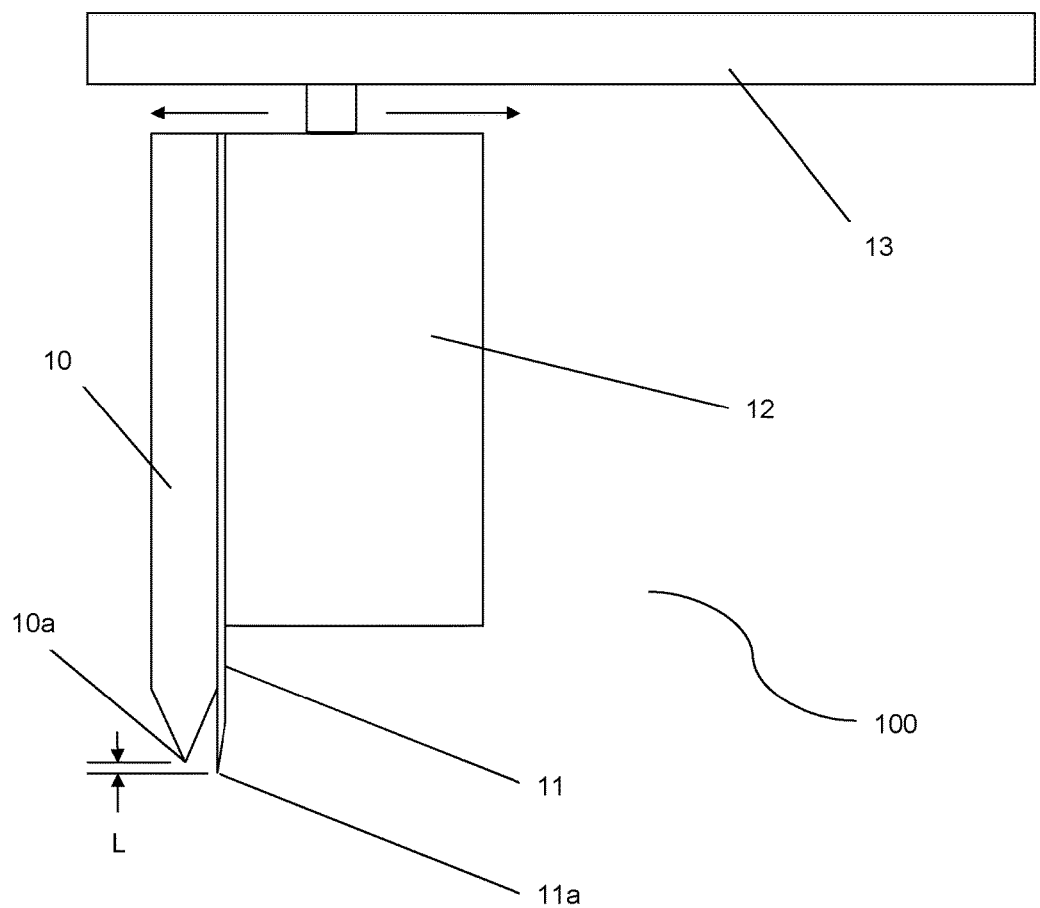
FIG. 2 illustrates a doctor device in accordance with an embodiment of the invention.
Figure 3:
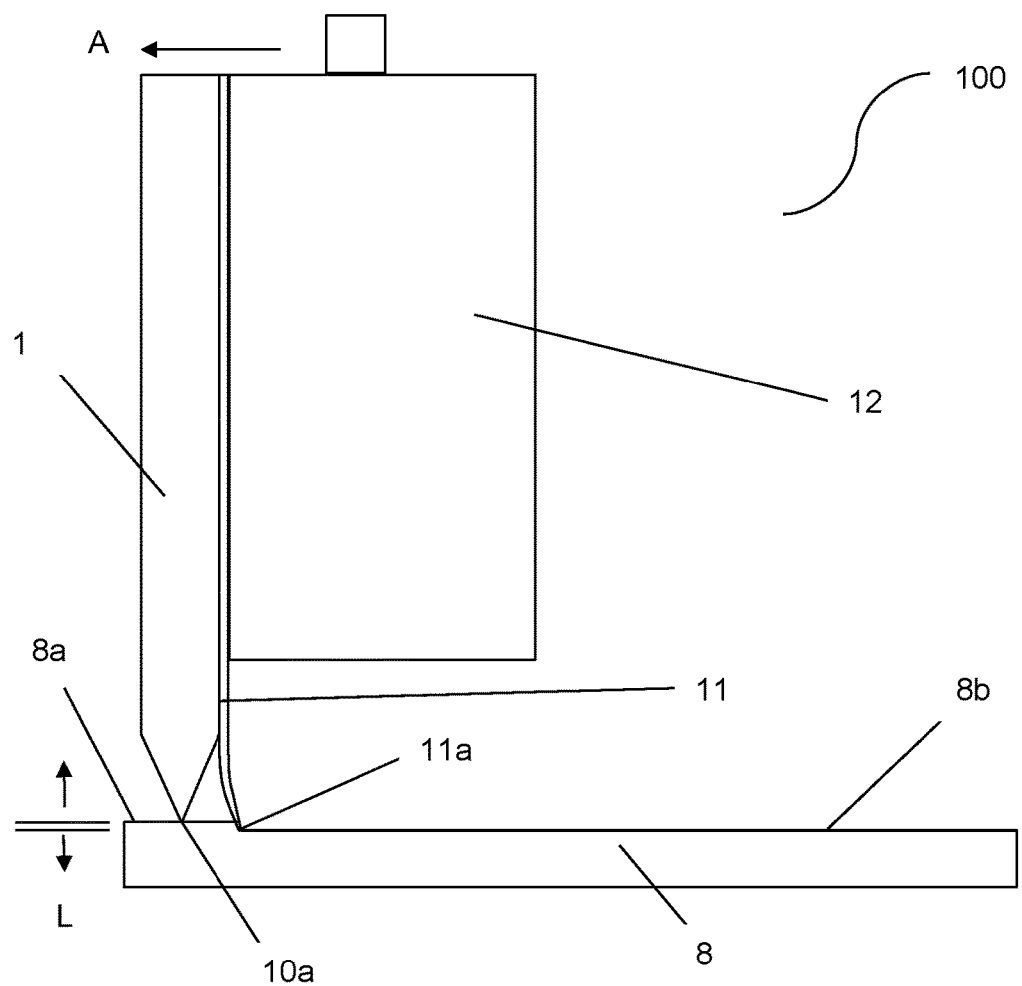
FIG. 3 illustrates the doctor device of FIG. 2 being swept across a surface in a first direction.
Figure 4:
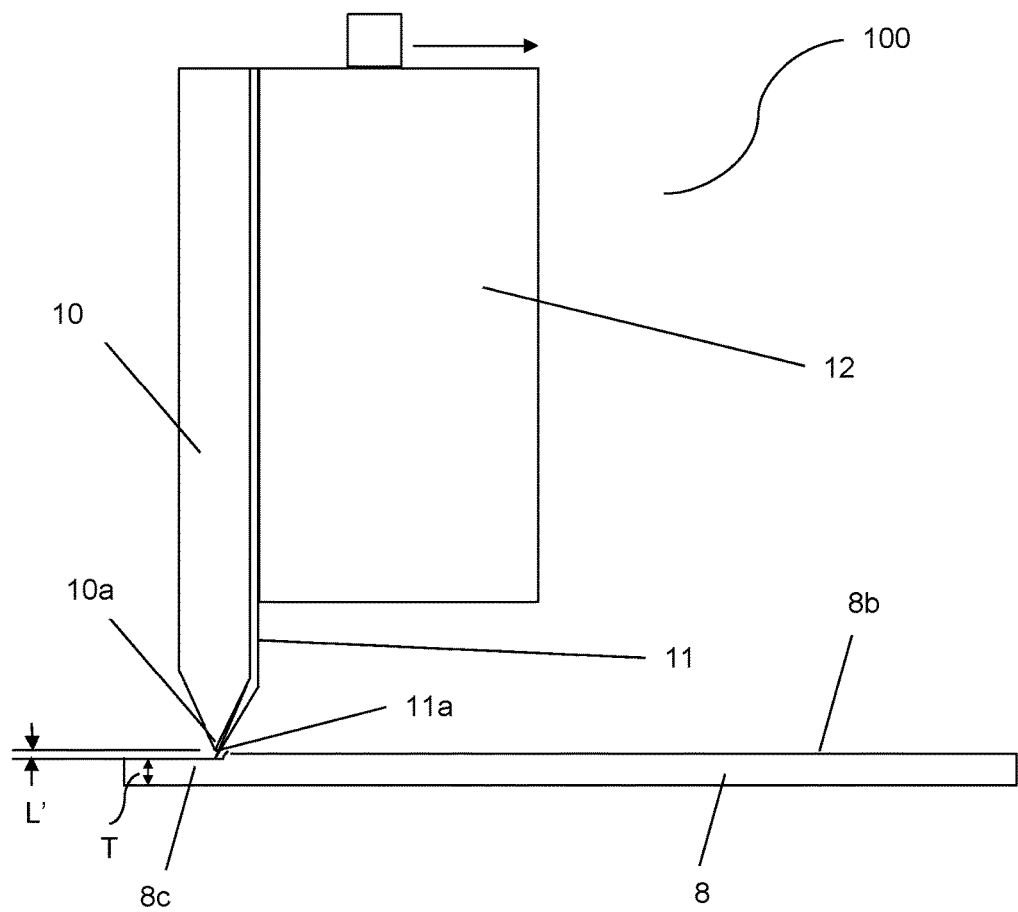
FIG. 4 illustrates the doctor device of FIGS. 2 and 3 being swept across a surface in a second direction.

FIGS. 2, 3 and 4 illustrate a doctor device in accordance with an embodiment of the invention.

As can be seen from FIG. 2, a doctor device 10, 11, comprises a first rigid blade 10 arranged adjacent a second, flexible blade 11. The tip 11a of the flexible blade 11 extends beyond the tip 10a of the rigid blade 10 by an amount L. The blades 10, 11 are assembled on a mount 12 which serves as a carriage and is moveable in two opposing directions along a rail 13. FIG. 3 shows the doctor device 1 during a sweep in a first direction A across a top layer 8 having a top surface 8a. As can be seen, the rigid blade 10 is positioned with its tip 10a adjacent (or optionally slightly above) the top surface 8a. The tip 11a sits just below the top surface 8a. As the assembly 100 moves, the flexible blade 11 flexes away from the direction of travel applying less stress to the underlying material as it draws fluid across creating a new top surface 8b. With the flexible blade 11 the instantaneous force referred to above is dissipated by the blade 11 flexing away from the direction of travel and reducing the force on the material in the layer 8 and the underlying solid body 7. The inventors have found the flexibility provided significantly reduces the forces on the body 7 whilst maintaining a controlled surface thickness of the top layer 8. It has also been found to improve surface finishes.

As can be seen in FIG. 4, the assembly 100 then makes a reverse pass across the new top surface 8b. During this pass, the flexible blade 11 flexes towards the rigid blade 10, their tips 10a, 11a becoming substantially coincident. In this sweep direction, the two blades 10,11 operate substantially as a single doctor blade and smooth off any unevenness to a depth L' (which typically is substantially less than L) to form a smoothed top surface 8c of a layer 8 having a desired final thickness T.

In the arrangement shown in FIGS. 3 and 4 the doctor device is set up to sweep in a reverse direction immediately after the first sweep. During sweeping in the reverse direction, the blades 10, 11 work in unity as a single, stiff blade. The height of the layer 8 is reduced significantly in the forward sweep and therefore there is less need to reduce forces in the second sweep. The stiffer blade 10, 11 ensures a more accurate removal of any remaining material (that is material between top surface 8b and top surface 8c) and a more consistent resulting thickness T of top layer 8.

A further benefit of the described embodiment is its suitability to use with non-Newtonian fluids. This can be explained by the following equation that defines the shear rate produced during sweeping of a doctor blade:

$$\text{Shear rate} = \text{blade velocity}/\text{layer thickness}$$

Referring back to FIG. 1, when the blade 9 passes over the region 5 which contains a considerable depth of fluid material, the shear rate is very low, however, as the blade 9 passes from region 5 to top layer 8, the depth of fluid material is significantly reduced and the shear rate becomes very high. This is important for non-Newtonian materials and in particular those that exhibit shear-thickening behaviour, its viscosity increasing with the shear rate. This is a significant problem when the blade 9 is moved at speed. At higher viscosities, higher stress must be imposed to cause flow in top layer 8 and this can increase load on the solidified body 7 resulting in damage to the body 7. The extent of this problem can be significantly reduced by using a doctor device in accordance with the invention.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A doctor device configured for use in recoating in an operating additive layer manufacturing apparatus, the doctor device comprising:
   at least one blade having a first surface and a second surface, the at least one blade being configured to move in a first direction and a second direction, which is opposite to the first direction, wherein:
      the first surface is configured to bend in the second direction upon the at least one blade moving in the first direction and contacting a surface of an additive layer; and
      the second surface is configured to be rigid upon the at least one blade moving in the second direction and contacting the surface of an additive layer, such that the at least one blade does not bend.

2. The doctor device as claimed in claim 1, further comprising a plurality of blades including the at least one blade, a first blade of the plurality of blades being more flexible than a second blade of the plurality of blades.

3. The doctor device as claimed in claim 2, further comprising one or more blades located between the first blade and the second blade of the plurality of blades, the first blade, one or more blades, and the second blade being arranged in sequence in decreasing order of flexibility.

4. The doctor device as claimed in claim 1, wherein the at least one blade includes a first flexible blade adjacent and in parallel alignment with a second rigid blade, which is less flexible than the first blade, such that flexure of the first blade is restricted by abutting against the second blade when drawn in the second direction across the surface of the additive layer.

5. The doctor device as claimed in claim 1, wherein flexure is achieved by use of a flexible material.

6. The doctor device as claimed in claim 1, wherein flexure is achieved by the at least one blade being made of non-flexible material arranged to pivot under a load in the first direction, such that the pivot provides the flexure.

7. The doctor device as claimed in claim 6, wherein the at least one blade is arranged to abut against a stop when drawn in the second direction.

8. The doctor device as claimed in claim 1, wherein flexure is achieved by a resilient member connecting the at least one blade made of a non-flexible material to a body, the resilient member being arranged to provide flexure in the first direction and no flexure in the second direction.

9. The doctor device as claimed in claim 1, wherein the at least one blade is formed of at least aluminium, stainless steel, or an elastomer.

10. The doctor device as claimed in claim 1, wherein the doctor device is mounted to a carriage which is configured in use to travel across the surface of the additive layer.

11. The doctor device as claimed in claim 10, wherein the surface of the additive layer is presented by a height-adjustable platform that supports a body bearing the surface of the additive layer.

12. A doctor device configured for use in recoating in an operating additive layer manufacturing apparatus, the doctor device comprising:
   a first blade having a first surface and a second surface, the first blade being configured to move in a first direction and a second direction, which is opposite to the first direction; and
   a second blade having a first surface and a second surface, the second blade being configured to move in the first direction and the second direction, the second blade being more flexible than the first blade, wherein:
      a tip of the second blade extending beyond a tip of the first blade towards a surface of an additive layer,
      the first surface of the second blade is configured to bend in the second direction upon the first blade and the second blade moving in the first direction and contacting the surface of the additive layer, and
      the second surface of the second blade is configured to bend in the first direction upon the first blade and the second blade moving in the second direction towards the first blade and contacting the surface of the additive layer.

* * * * *